(12) United States Patent
Shao et al.

(10) Patent No.: US 12,546,932 B2
(45) Date of Patent: Feb. 10, 2026

(54) ILLUMINATION UNIT, ILLUMINATION GLASS ASSEMBLY AND WINDOW ASSEMBLY

(71) Applicant: SAINT-GOBAIN GLASS FRANCE, Courbevoie (FR)

(72) Inventors: Hui Shao, Shanghai (CN); Siteng Ma, Shanghai (CN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 0 days.

(21) Appl. No.: 18/839,789

(22) PCT Filed: Feb. 21, 2023

(86) PCT No.: PCT/CN2023/077330
§ 371 (c)(1),
(2) Date: Aug. 20, 2024

(87) PCT Pub. No.: WO2023/160519
PCT Pub. Date: Aug. 31, 2023

(65) Prior Publication Data
US 2025/0147227 A1    May 8, 2025

(30) Foreign Application Priority Data
Feb. 23, 2022 (CN) .......................... 202210166384.9

(51) Int. Cl.
*F21V 8/00*    (2006.01)

(52) U.S. Cl.
CPC ............. *G02B 6/009* (2013.01); *G02B 6/003* (2013.01); *G02B 6/0068* (2013.01)

(58) Field of Classification Search
CPC ...... B60Q 3/208; B60Q 1/268; B60Q 1/2696; F21V 8/00
See application file for complete search history.

(56) References Cited

U.S. PATENT DOCUMENTS

| | | | |
|---|---|---|---|
| 11,194,085 B2 * | 12/2021 | Vasylyev | G02B 6/0028 |
| 2015/0291084 A1 * | 10/2015 | Gold | B60Q 1/268 |
| | | | 362/516 |
| 2016/0059680 A1 | 3/2016 | Snider et al. | |

FOREIGN PATENT DOCUMENTS

| CN | 102865499 A | 1/2013 |
|---|---|---|
| CN | 103261796 A | 8/2013 |

(Continued)

OTHER PUBLICATIONS

International Search Report as issued in International Patent Application No. PCT/CN2023/077330, dated May 4, 2023.

*Primary Examiner* — William J Carter
(74) *Attorney, Agent, or Firm* — Pillsbury Winthrop Shaw Pittman LLP (57) ABSTRACT

An illumination unit includes a light source and a light guiding component, and the light source includes a plurality of light emitting modules distributed in an arc shape to make the emitted incident light to be emitted through the light guiding component to present an angled irradiation range. By providing a plurality of light emitting modules distributed in an arc shape and a corresponding matched light guiding component, the illumination unit can provide an illumination function to illuminate the space while providing a visually attractive illumination effect when being applied to an illumination glass, thus providing more feasibility for product structure design and functional design, and being widely applicable to various occasions.

21 Claims, 4 Drawing Sheets

(56) References Cited

FOREIGN PATENT DOCUMENTS

| | | |
|---|---|---|
| CN | 206573824 U | 10/2017 |
| CN | 208847862 U | 5/2019 |
| CN | 215793096 U | 2/2022 |
| CN | 114103800 A | 3/2022 |
| TW | M328589 U | 3/2008 |

* cited by examiner

ILLUMINATION UNIT, ILLUMINATION GLASS ASSEMBLY AND WINDOW ASSEMBLY

CROSS-REFERENCE TO RELATED APPLICATIONS

This application is the U.S. National Stage of PCT/CN2023/077330, filed Feb. 21, 2023, which in turn claims priority to Chinese patent application number 202210166384.9 filed Feb. 23, 2022. The content of these applications are incorporated herein by reference in their entirety.

FIELD

The present disclosure relates to the technical field of glass, in particular to an illumination unit, an illumination glass assembly with the illumination unit and a window assembly applying the illumination glass assembly.

BACKGROUND

With the rapid development of automobile industry and the increasing demand of consumers for vehicle functions, glass with illumination effect has been widely valued by vehicle manufacturers and favored by the consumers. Generally, the glass with illumination effect adopts the method of applying illumination enamel or ink on one side of glass plate based on pattern design, and transmitting incident light emitted by light source arranged on the side of the glass plate or integrated in the glass plate through the pattern area by scattering or diffusing, so as to realize illumination with different effects.

Figure 1:
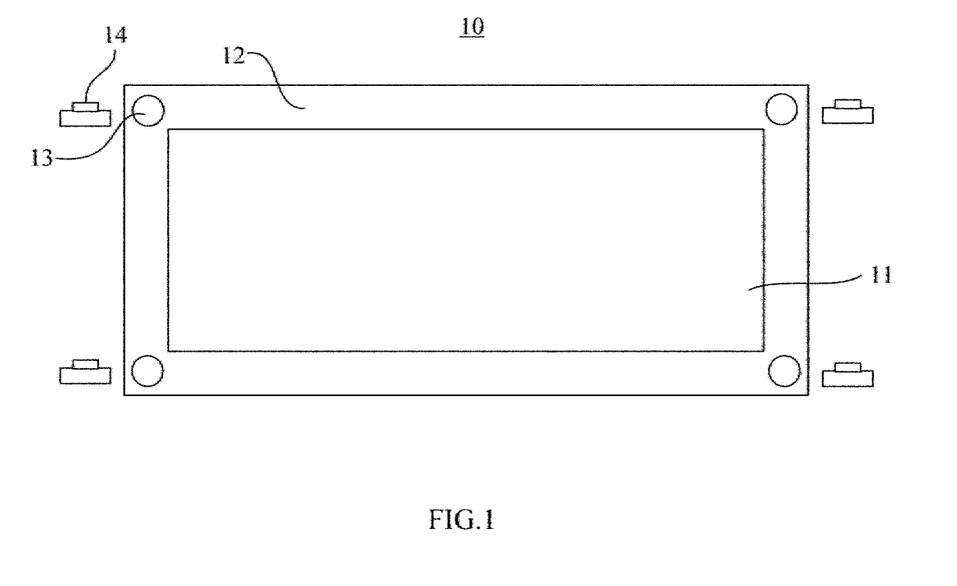
FIG. 1 is a schematic view of an existing illumination glass assembly, showing illumination modules that can be arranged in openings on a glass body.

As shown in FIG. 1, as a traditional illumination method, an illumination glass assembly 10 comprises a glass body 11, and openings 13 are formed in edge areas 12 of the glass body 11 to accommodate illumination modules 14. Taking four illumination modules as an example, each illumination module 14 is correspondingly arranged in each opening 13 at the corner of the glass body 11, so as to illuminate an area of the glass body. For this kind of illumination mode, several illumination modules usually work together to illuminate the whole glass body, which requires consideration of factors such as controlling the illumination uniformity of each illumination module, and it is difficult to produce diversified illumination effects.

SUMMARY

The purpose of the present disclosure is to propose an illumination unit for an illumination glass and applications thereof, which can provide functional illumination to illuminate space and also provide visually attractive illumination effects, such as dynamic twinkling or flashing effects.

To this end, according to one aspect of the present disclosure, an illumination unit for an illumination glass is provided. The illumination unit comprises a light source and a light guiding component, and the light source comprises a plurality of light emitting modules distributed in an arc shape to make the emitted incident light to be emitted through the light guiding component to present an angled irradiation range.

According to the above technical concept, the present disclosure may further include any one or more of the following alternative forms.

In some alternative forms, the light guiding component is an arc-shaped light guiding component adapted to the plurality of light emitting modules, and the arc-shaped light guiding component comprises an incident surface attached to the plurality of light emitting modules and an exit surface.

In some alternative forms, the light emitting module is a light emitting diode.

In some alternative forms, the arc-shaped light guiding component has a triangular cross section.

In some alternative forms, the cross-sectional dimension of the incident surface is 1 mm to 2.5 mm.

In some alternative forms, the angle opposite to the incident surface in the triangular cross section is 10° to 13°.

In some alternative forms, the illumination unit further comprises a light condensing component, and the incident light enters the light guiding component via the light condensing component.

In some alternative forms, the light condensing component comprises a convex lens arranged between the light source and the light guiding component.

In some alternative forms, the light condensing component is composed of the incident surface of the light guiding component, and the incident surface protrudes toward the light source.

In some alternative forms, the material of the light guiding component is selected from glass, polymethyl methacrylate, cycloolefin plastic or alicyclic methacrylate copolymer.

In some alternative forms, the illumination unit further comprises a control module coupled to the light source and configured to control output intensity and/or output time of one or more of the light emitting modules.

According to another aspect of the present disclosure, an illumination glass assembly is provided. The illumination glass assembly comprises: a glass body comprising a first surface and a second surface oppositely arranged; and an illumination unit mentioned above, which is arranged on the first surface of the glass body and makes the emitted incident light enter the glass body via the light guiding component to present an angled irradiation range.

According to the above technical concept, the present disclosure may further comprise any one or more of the following alternative forms.

In some alternative forms, the glass body is a first glass body, and the illumination glass assembly further comprises a second glass body attached to the first glass body through an intermediate layer, wherein the second glass body comprises a third surface facing the second surface and a fourth surface oppositely arranged, and the illumination unit is arranged on the first surface or the fourth surface.

In some alternative forms, the illumination unit is attached to the glass body by an adhesive.

In some alternative forms, the adhesive is selected from ultraviolet adhesive, optical glue or acrylic acid.

In some alternative forms, the illumination glass assembly comprises at least one illumination unit arranged adjacent to the edge and/or corner of the glass body.

According to another aspect of the present disclosure, a window assembly is provided. The window assembly comprises an illumination glass assembly mentioned above, wherein the window assembly comprises door, window, curtain wall, vehicle window glass, airplane glass or ship glass.

In some alternative forms, the window assembly is a vehicle window glass comprising front windshield, rear windshield, skylight glass, vehicle door glass or corner window glass.

By providing a plurality of light emitting modules distributed in an arc shape and a corresponding matched light guiding component, the illumination unit of the present disclosure can provide an illumination function to illuminate the space while providing a visually attractive illumination effect when being applied to an illumination glass, thus providing more feasibility for product structure design and functional design, and being widely applicable to various occasions.

BRIEF DESCRIPTION OF THE DRAWINGS

Other features and advantages of the present disclosure will be better understood by the following alternative embodiments described in detail in conjunction with the accompanying drawings, in which the same reference numerals identify the same or similar parts, in the drawings.

DETAILED DESCRIPTION OF EMBODIMENTS

The implementation and use of the embodiments are discussed in detail below.

However, it should be understood that the specific embodiments discussed merely exemplify the specific ways of implementing and using the present disclosure, and do not limit the scope of the disclosure. When describing the structural positions of various components, such as the directions of upper, lower, top, bottom, etc., the description is not absolute, but relative. When the various components are arranged as shown in the figures, these directional expressions are appropriate, but when the positions of the various components in the figures would be changed, these directional expressions would also be changed accordingly.

In this context, the expression "including" or similar expressions "comprising", "containing" and "having" which are synonymous are open, and do not exclude additional unlisted elements, steps or ingredients. The expression "consisting of . . . " excludes any element, step or ingredient that is not specified. The expression "consisting essentially of . . . " means that the scope is limited to the specified elements, steps or ingredients, plus the optional elements, steps or ingredients that do not materially affect the basic and new features of the claimed subject matter. It should be understood that the expression "comprising" covers the expressions "consisting essentially of" and "consisting of".

In this context, the terms "first", "second" and so on are not used to limit the sequence and the number of components unless otherwise stated.

In this context, the meanings of "a plurality of" and "multiple layers" refer to two or more than two, unless otherwise specified.

In this context, unless otherwise specified, the terms such as "installation", "connection" and "attach" should be understood broadly. For example, it can be fixed connection, detachable connection or integrated; it can be directly connected or indirectly connected through an intermediate medium, and it can be the internal communication of two elements or the interaction between two elements. For those skilled in the art, the specific meanings of the above terms in this context can be understood according to specific situations.

In this context, "glass" is an amorphous inorganic non-metallic material, which is generally made of a variety of inorganic minerals (such as quartz sand, borax, boric acid, barite, barium carbonate, limestone, feldspar, soda ash, etc.) as main raw materials, and a small amount of auxiliary raw materials. Its main components are silica and other oxides. In the described embodiments, the thickness of the glass is the thickness commonly used in the art, and the thickness of each laminated structure on the glass is suitable for the conventional range, and is not limited as shown in the figures and the following detailed description. In addition, although it is shown as plane glass in the figures, the glass of the present disclosure may also be curved glass. In various embodiments, it is described as an independent glass body or a glass plate, however, in some cases, the surface of the glass body can also use special coating to improve thermal insulation and/or comfort, and the glass body can also be laminated glass to obtain diversified functions or effects. In this context, the "surface" of the glass body is bounded by a plane where the length and width of the glass body lie, and the "side" is bounded by a plane where the length or width and thickness of the glass body lie.

Hereinafter, an illumination glass assembly applied to a vehicle window glass will be described, but it is not excluded that the illumination glass assembly can be applied to the building fields such as door, window, curtain wall, and other vehicle environments such as airplane glass or ship glass. When the illumination glass assembly is used to describe the window glass of a vehicle, "outside" and "inside" refer to the directions relative to vehicle body, "outside" refers to the direction away from the vehicle body and "inside" refers to the direction facing the vehicle body. It should be understood that the vehicle window glass according to the embodiment of the present disclosure includes, but is not limited to, front windshield, rear windshield, skylight glass, vehicle door glass or corner window glass, which can provide different illumination effects based on different requirements.

It is realized that in the illumination glass assembly 10 shown in FIG. 1, each illumination module 14 illuminates a specific area of the glass body 11, and illumination effect is realized by turning on or turning off the illumination modules. In this way, the irradiation range and illumination uniformity of the whole glass body 11 cannot be well obtained by controlling each illumination module 14. The light energy utilization rate of the illumination modules is low, and the luminous effect is poor. Moreover, the process difficulty and the process cost are increased if providing the openings 13 in the glass body 11. Especially, with the increasing demand of the consumers for diversified illumination effects, this traditional illumination method is difficult to produce some visual effects such as dynamic lights, which makes the products lack market competitiveness.

According to the concept of the present disclosure, light emitting modules with specific distribution are designed for the illumination module, and a light guiding component is provided, wherein the light emitting modules provide incident light emitted at an angle, so that the illumination range is increased, and the incident light is guided into the glass body through the light guiding component at the same time, thereby reducing the illumination loss and making the illumination visual effect better. In some cases, different control strategies can also be combined to achieve dynamic twinkling or flashing effects.

Figure 2A:
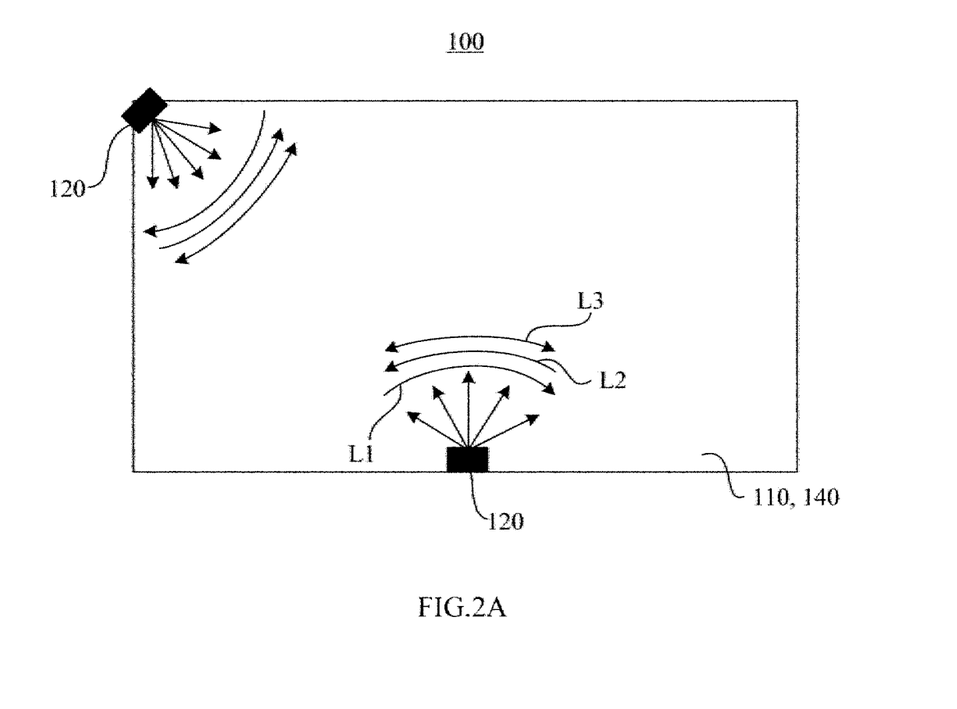
FIG. 2A is a schematic view of an illumination glass assembly according to an embodiment of the present disclosure, showing the distribution of illumination units.
Figure 2B:
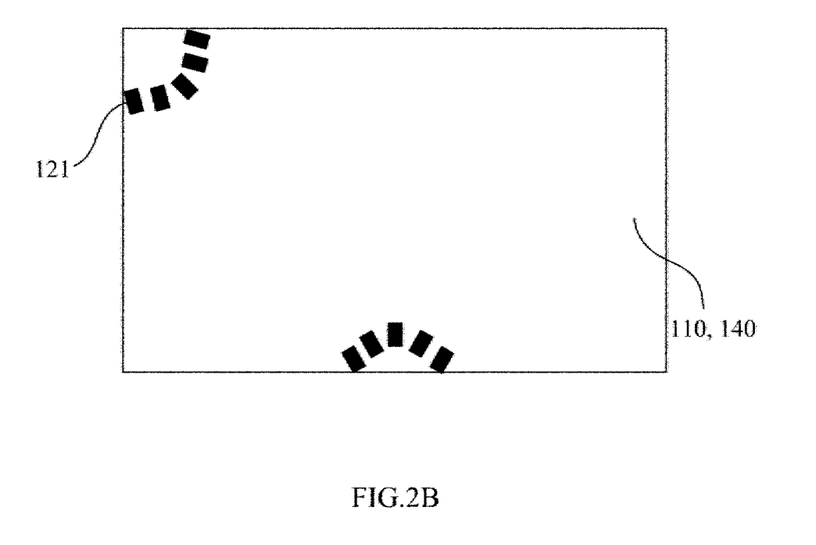
FIG. 2B is similar to FIG. 2A, showing the distribution of light emitting modules in the illumination unit.
Figure 3:
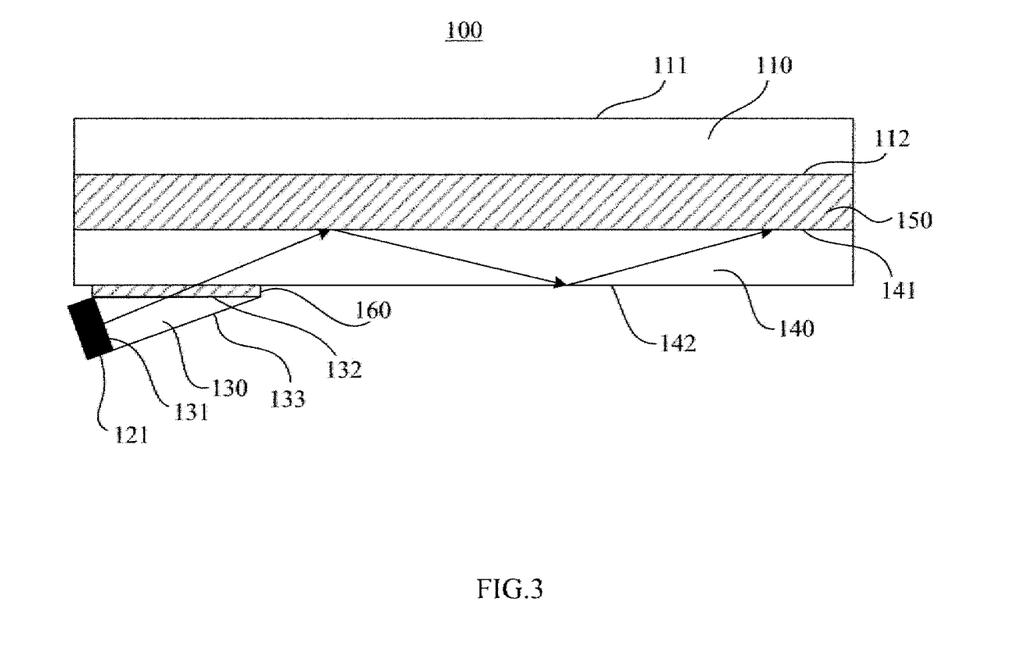
FIG. 3 is a schematic cross-sectional view of an illumination glass assembly according to an embodiment of the present disclosure.

Referring to FIGS. 2A to 3, an illumination glass assembly 100 according to an embodiment of the present disclosure is shown, which includes a glass body and an illumination unit. In some embodiments, the glass body can be a monolithic glass or laminated glass. When a monolithic glass is used, the glass body has a first surface facing the outside of the vehicle and a second surface facing the inside of the vehicle, and the illumination unit is arranged on the second surface to realize the illumination effect on the inside of the vehicle. When it is applied to the front windshield or skylight glass in the vehicle window glass, laminated glass can be selected. The laminated glass includes at least two layers of glass bodies and an intermediate layer (for example, PVB, i.e. polyvinyl butyral, or EVA, i.e. ethylene-vinyl acetate copolymer) that bonds them together. As shown in FIG. 3, the illumination glass assembly 100 includes a first glass body 110 and a second glass body 140, which are attached to each other by an intermediate layer 150. The first glass body 110 has a first surface 111 and a second surface 112, and the second glass body 140 has a third surface 141 facing the second surface 112 and a fourth surface 142 arranged oppositely. The illumination unit can be arranged on the first surface 111 of the first glass body 110 or the fourth surface 142 of the second glass body 140. Taking the skylight glass as an example, the first glass body 110 can be called the outer glass, the second glass body 140 can be called the inner glass, and the illumination unit is arranged on the fourth surface 142 facing the interior of the vehicle.

According to the present disclosure, the illumination unit is arranged on the surface of the glass body instead of being placed in the glass body, which reduces the process cost and is more suitable for wide applications. Depending on different illumination requirements, the illumination glass assembly may include at least one illumination unit arranged adjacent to the edge and/or corner of the glass body. FIG. 2A exemplarily illustrates two illumination units arranged at one edge and one corner of the first glass body 110 or the second glass body 140, respectively.

Figure 4:
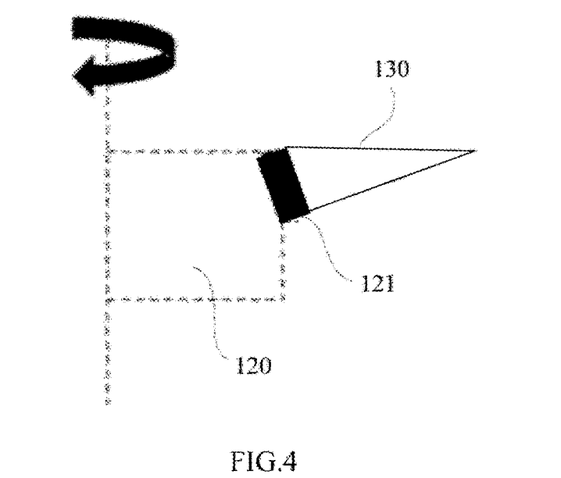
FIG. 4 is a schematic view showing that the light guiding component rotates around the light emitting module to form an arc shape.

According to the present disclosure, the illumination unit includes a light source 120 and a light guiding component 130. The incident light emitted by the light source 120 is emitted through the light guiding component 130. When the illumination unit is applied to an illumination glass, the incident light enters the glass body through the light guiding component 130 and is totally reflected in the glass body. According to an embodiment shown in FIG. 2B, the light source 120 includes a plurality of light emitting modules 121 distributed in an arc shape, and each light emitting module 121 can be a light emitting diode (LED), for example. Optionally, the light emitting module may be composed of other components suitable for emitting light. According to the present disclosure, the light guiding component 130 is adapted to the plurality of light emitting modules 121, that is, it is configured as an arc-shaped light guiding component with rotation radius. In a preferred embodiment, an arc-shaped light guiding component with a triangular cross section is adopted. In the present disclosure, the arc-shaped light guiding component is preferably constructed as an integrated component arranged around the plurality of light emitting modules, which is beneficial to the manufacture and assembly of each component in the illumination unit, thus simplifying the design and reducing the cost, and helping to reduce the light loss. However, it does not mean to exclude the way that the light guiding element is constructed as a plurality of light guiding elements with arc shape distribution corresponding to the plurality of light emitting modules. For example, the number of the light guiding components may be the same as the number of the light emitting modules. At this time, as an example, the plurality of light guiding components may be configured in the form of prisms. In addition, it can be understood by those skilled in the art that the cross section of the light guiding component 130 can take other shapes than triangle according to actual requirements. For example, the surface 133 shown in FIG. 3 is not limited to a plane. It should be understood that the arc-shaped light guiding component is arranged concentrically with the light source, as shown in FIG. 4, and the rotation radius of the arc-shaped light guiding component is determined based on the size of the light source 120 or the light emitting module 121 (the figure is only schematic but not the actual structure), while the rotation angle of the arc-shaped light guiding component is determined by the number and the illumination angle of light emitting modules.

Figure 5:
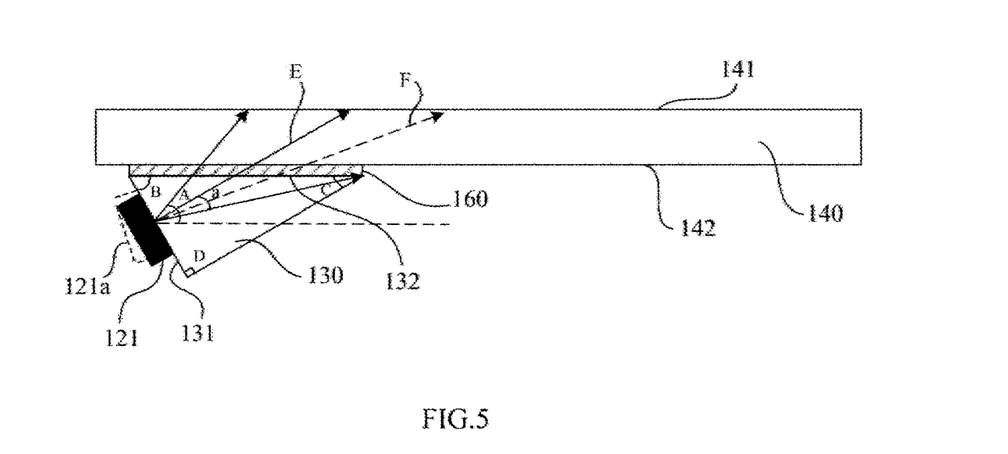
FIG. 5 is a schematic cross-sectional view showing the design principle of the illumination unit.

The illumination unit of the present disclosure can be formed as a single component, that is, the light source can be integrated with the light guiding component and then attached to the glass body, so that the illumination unit is modularized, and can be applied to the illumination glass by means of for example, bonding or mechanical connection according to different occasions, thereby reducing the production cost and use cost, and facilitating the improvement of production efficiency. Optionally, each component in the illumination unit can be attached to the illumination glass separately. For example, the light source is attached to the glass body or installed by a bracket adhered to the glass body, and the light guiding component can be installed with the light source by mechanical structure or adhesion. In the embodiment shown in FIG. 3, the arc-shaped light guiding component 130 includes an incident surface 131 attached to the light emitting module 121 and an exit surface 132 attached to the fourth surface 142 of the glass body 110. In some embodiments, the illumination unit (more specifically, the light guiding component 130 in the figure) is attached to the fourth surface 142 by an adhesive 160. Since the refractive index of the glass body 110 is about 1.51, the refractive index of PVB used as the intermediate layer 150 is about 1.48, the limit angle of total reflection in the glass should be about 11.5° according to Snell's Law. If the angle is large, there will be light attenuation. Therefore, as shown in FIG. 5, the angle A associated with the incident light indicated by the arrow is preferably 11.5°, and the incident light within this angle range can achieve good total reflection in the glass body. Due to the requirements of module layout size and process manufacturing, in the present disclosure, the angle C in the triangular cross section of the arc-shaped light guiding component opposite to the incident surface 131 is advantageously configured as 10° to 13° preferably 11.5°. For the convenience of intuitive explanation, the arc-shaped light guiding component 130 in FIG. 5 is exemplified as having a right triangle cross section, and the angle D is 90°, that is, the incident surface 131 corresponds to a right angle side of the right triangle. In a preferred design, the angle C is configured as 11.5°, the angle B is configured as 78.5° correspondingly, and the angle A is configured as 23°, so as to cover the optimal angle range of the total reflection of the incident light into the glass body. However, without departing from the concept of the present disclosure, these angle ranges can be changed based on actual requirements. As an example, in the above-mentioned preferred design, as shown in FIG. 5, the light E is perpendicular to the incident surface 131, and can be regarded as the light with the highest luminous intensity among the incident light emitted from the light emitting module 121. Meanwhile, according to the angle configuration in the above-mentioned preferred design, the incident angle of the light E is 11.5°. However, in order to achieve the effect of overall enhancement of the illumination intensity of the incident light, the light source can be rotated clockwise so that the light with the highest luminous intensity falls within the range of the angle a shown in the figure. For example, the light emitting module 121 shown in FIG. 5 is rotated into the light emitting module 121a shown by a dotted line, and the light F with the highest luminous intensity of the incident light emitted by the light emitting module 121a is substantially located in the middle of the angle a. Here, the angles B and D can be changed correspondingly when rotating the light source, while keeping the angle C unchanged.

In addition to the angle parameters of the cross section, the side length of the cross section can also be considered to help improve the illumination effects and reduce the size of the light guiding component. In the embodiment shown in FIG. 3, the cross-sectional size of the incident surface 131 of the light guiding component 130 in the illumination glass assembly 100 is configured to match the size of the light emitting module 121. For example, the specifications of LEDs in the market are usually between 1 mm and 2.5 mm. In the present disclosure, the cross-sectional size of the incident surface 131 is advantageously configured as 1 mm to 2.5 mm, for example, 2 mm, so that the incident light emitted by the light emitting module 121 enters the second glass body 140 via the light guiding component 130 and is totally reflected by combining the above angle parameters, as shown by the arrow in FIG. 3. In addition, the size of the light guiding component can be reduced accordingly. Certainly, as a preferred embodiment, the cross-sectional size of the incident surface shown in FIG. 3 is adapted to the size of the light emitting module, the present disclosure also covers the case where the cross-sectional size of the incident surface 131 shown in FIG. 5 is configured to be significantly larger than that of the light emitting module 121.

Figure 6:
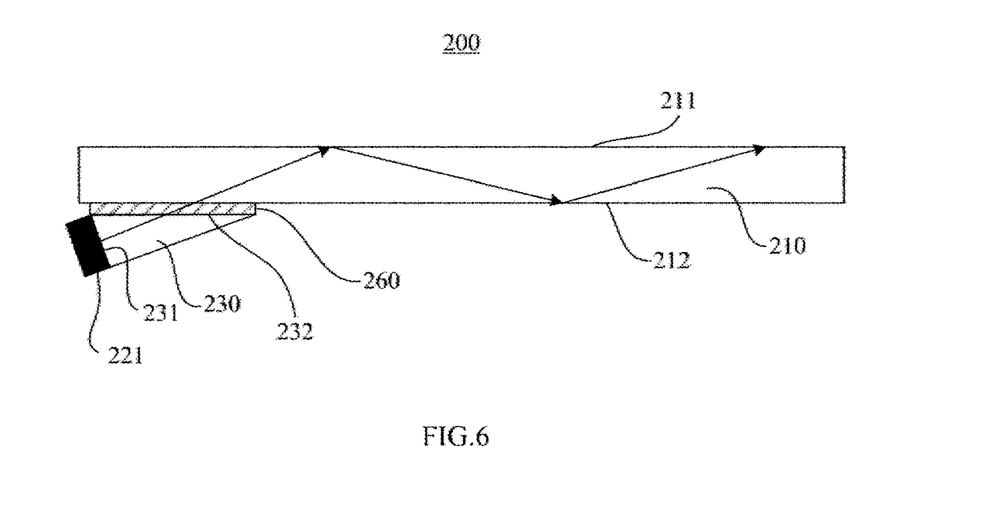
FIG. 6 is a schematic cross-sectional view of an illumination glass assembly according to another embodiment of the present disclosure.

In some embodiments, for example, in the form of a monolithic glass body, the configuration and size of the light guiding component can be changed based on the refractive index of the glass body and the refractive index of air, but the above-mentioned arc-shaped light guiding component with triangular cross section can still be used. At the same time, it can be understood by those skilled in the art that the technical points set forth above for the embodiments of the laminated glass are also applicable to the following monolithic glass body without violating the concept of the present disclosure, and will not be repeated here. In the embodiment shown in FIG. 6, an illumination glass assembly 200 includes a glass body 210 and an illumination unit. The glass body 210 has a first surface 211 and a second surface 212 arranged oppositely, and the illumination unit specifically includes a light source and a light guiding component 230, wherein the light source includes a plurality of light emitting modules 221 distributed in an arc shape, and the light guiding component 230 is an arc-shaped light guiding component adapted to the plurality of light emitting modules 221. An incident surface 231 of the light guiding component is attached to the light emitting modules 221, and an exit surface 232 is attached to the second surface 212 of the glass body 210 by an adhesive 260. In FIG. 6, it is shown as an example that the cross-sectional size of the incident surface 231 is adapted to the size of the light emitting module 221. However, similar to that described above with respect to FIG. 5, the present disclosure also covers the case where the cross-sectional size of the incident surface 231 is configured to be significantly larger than that of the light emitting module 221.

In some embodiments, in order to reduce the interference of lost light, with reference to FIG. 3, an enamel layer or an ink layer can be provided on the second surface 112 or the third surface 141 of the illumination glass assembly 100 to realize shielding. In some embodiments, an anti-reflection film may also be provided on the reflecting surface 133 of the light guiding component 130.

Figure 7:
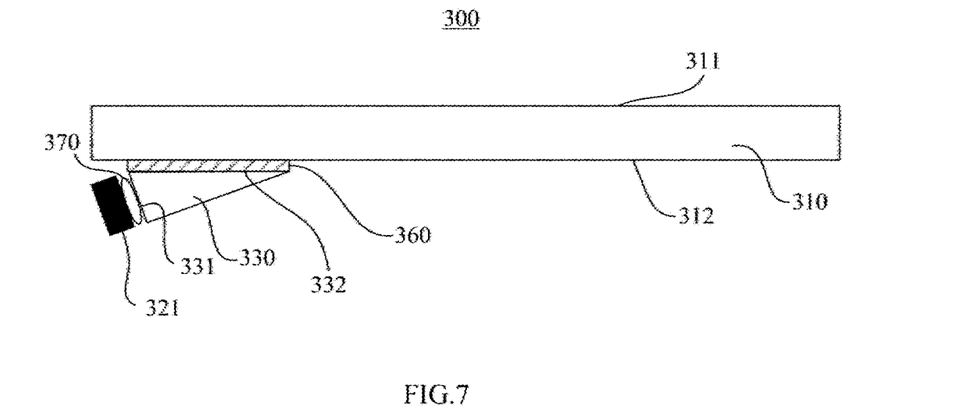
FIG. 7 is a schematic cross-sectional view of an illumination glass assembly according to another embodiment of the present disclosure.

In some embodiments, the illumination unit may further include a light condensing component, and the incident light is condensed by the light condensing component before entering the light guiding component. An embodiment of an illumination glass assembly 300 shown in FIG. 7 takes a monolithic glass body as an example, but those skilled in the art can understand that this embodiment is also applicable to the laminated glass as shown in FIG. 3. In this embodiment, a glass body 310 has a first surface 311 and a second surface 312 oppositely arranged, an exit surface 332 of a light guiding component 330 is attached to the second surface 312 of the glass body 310 by an adhesive 360, and a condensing component 370 in the form of a convex lens, for example, is arranged between an incident surface 331 and the light emitting module 321. Therefore, the incident light emitted by the light emitting module 321 is gathered and then enters the light guiding component 330, so that the incident light is fully utilized, and the intensity of the light transmitted and totally reflected in the glass body 310 is enhanced. It can be understood that, as described in connection with the previous embodiments, since the plurality of light emitting modules 321 are distributed in an arc shape and the corresponding light guiding component 330 is configured as an arc-shaped light guiding component with rotation radius, the light condensing component 370 can also be correspondingly configured as an arc-shaped light condensing component with rotation radius. Certainly, it is not excluded here that a plurality of light condensing elements 370 (for example, convex lenses) having the same number as the light emitting modules 321 constituting the light source may also be included, and the plurality of light condensing elements 370 are distributed in an arc shape.

Figure 8:
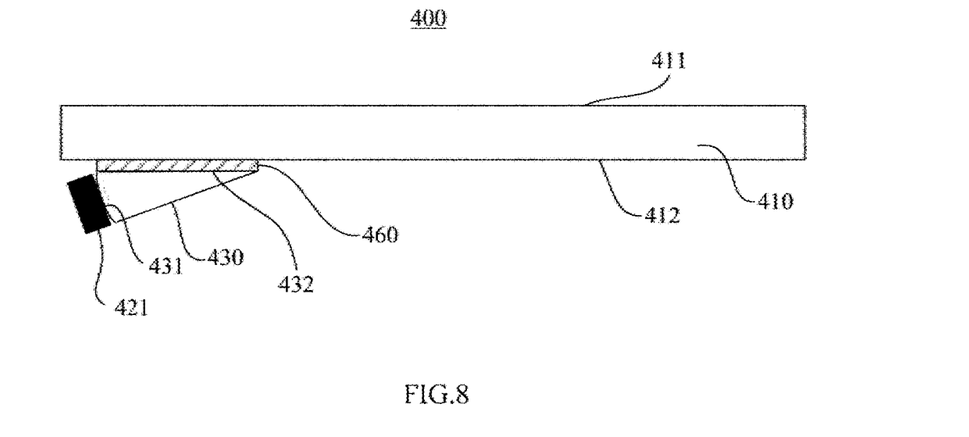
FIG. 8 is a schematic cross-sectional view of an illumination glass assembly according to another embodiment of the present disclosure.

In some embodiments, the light condensing component may be composed of the incident surface of the light guiding component. As shown in FIG. 8, in this embodiment, a glass body 410 of an illumination glass assembly 400 has a first surface 411 and a second surface 412 oppositely arranged. An exit surface 432 of a light guiding component 430 is attached to the second surface 412 of the glass body 410 by an adhesive 460, and an incident surface 431 protrudes toward the light emitting module 421, so that it can also play a light condensing effect. In addition, this way is convenient to integrate the light condensing component with the light guiding component, and the structure is simple.

In the above embodiments, the light source is formed by the light emitting modules distributed in an arc shape, and thus the illumination glass assembly of the present disclosure can achieve an angled irradiation range, which changes the conventional illumination mode in the existing design, greatly improves the illumination range and uniformity, has a better luminous visual effect, and realizes a more attractive illumination effects. Especially, by adopting the arc-shaped light guiding component, the reflectivity of the incident light emitted by the light source is greatly reduced, thus reducing the light loss and light interference, and obtaining an enhanced illumination effect. In some embodiments, combined with different control strategies, the illumination glass assembly can also achieve diversified illumination effects, such as angular dynamic twinkling or bright and dark flashing, light color change, etc.

Advantageously, in the above embodiments, the materials of the light guiding component and the adhesive are selected to have a refractive index similar to that of the glass, so that the incident direction of the incident light is basically unchanged when it is transmitted to the glass body via the light guiding component and the adhesive. Optionally, the material of the light guiding component includes but is not limited to glass, polymethylmethacrylate (PMMA), cycloolefin plastic (such as Zeonex E48R) or alicyclic methacrylate copolymer (such as Optorez. 1330), and the adhesive includes but is not limited to ultraviolet (UV) adhesive, optical adhesive (OCA) or acrylic acid.

Returning to FIGS. 2A and 2B again, the light emitting module 121 constituting the light source 120 can be three primary colors (RGB) LED or four primary colors (RGBW) LED to achieve richer optical effects. FIG. 2B shows the plurality of light emitting modules 121 arranged in an arc shape, such as five LEDs, which can be selected to be the same as or different from each other. In some embodiments, the illumination unit further includes a control module, which is coupled to the light source and configured to control output intensity and/or output time of one or more light emitting modules (such as LEDs). FIG. 2A exemplarily illustrates several control strategies, in which the light source 120 is configured to emit light in five directions as indicated by arrows. Line L1 indicates that the control module controls the output intensity and/or output time of five LEDs from left to right, line L2 indicates that the control module controls the output intensity and/or output time of five LEDs from right to left, and line L3 indicates that the control module controls the output intensity and/or output time of five LEDs from center to both ends. Therefore, the illumination effects can be further enhanced by setting the color, number and/or distribution of LEDs, such as at least one illumination effect of monochromatic illumination, multiple colors illumination, continuous illumination, dynamic flashing illumination, running water illumination and breathing light illumination.

Figure 9:
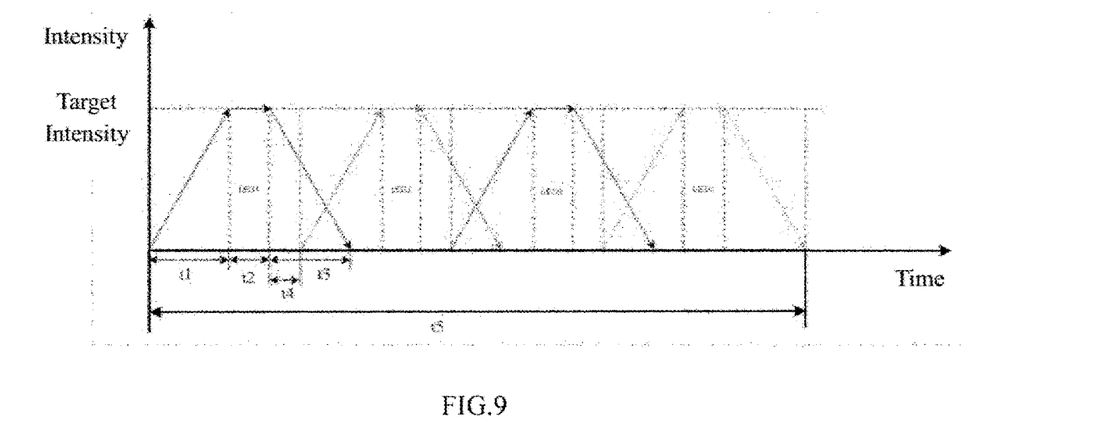
FIG. 9 shows the control principle view of illumination unit forming dynamic effect.

FIG. 9 exemplarily illustrates an illumination effect, in which the light source of the illumination unit includes four LEDs, taking four different color LEDs as an example, including LED 1 (e.g. white), LED 2 (e.g. red), LED 3 (e.g. blue) and LED 4 (e.g. green). One control strategy is that when the previous LED is not completely turned off, the next LED starts to light up. To this end, the process of each LED from the off state to the state of lighting to the target intensity and then to the off state can be divided into three time periods, namely, fade-in time t1, retention time t2 and fade-out time t3. The fade-in time t1 refers to the time which takes for the LED to turn on from the off state to the target intensity state, the retention time t2 refers to the time which takes for the LED to keep the target intensity state, and the fade-out time t3 refers to the time which takes for the LED to turn off from the target intensity state. As can be seen in FIG. 9, the time difference between the dimming of one LED 1 from the target intensity state and the lighting state of the next LED 2 is defined as internal delay time t4, while the time difference between the lighting state of the first LED 1 and the off state of the last LED 4 is defined as start-up delay time t5, that is, the illumination time of the light source in the illumination unit. By adopting this control strategy, the present disclosure can realize the gradual change effect of multiple colors in one illumination unit. When multiple LEDs of the same color are used, the effect of dynamic twinkling or bright and dark flashing can be realized. Combined with different control strategies, the dynamic lighting effect among multiple illumination units on the illumination glass can also be realized.

The above-mentioned dynamic illumination effect of the present disclosure is different from the existing solution in that the existing solution adopts a large number of light sources at different positions of the glass to cover the glass area as much as possible, and the illumination effect is generated by turning on or turning off the light sources in the whole glass area. The illumination range and uniformity of this illumination effect cannot satisfy the consumers, and the design is complicated, the cost is high, and the utilization rate of the light sources is not high. In contrast, the present disclosure provide a plurality of light emitting modules distributed in an arc shape and a corresponding matched arc-shaped light-guiding component, which effectively expand the illumination range with a relatively reduced number of components on the premise of making full use of light sources, and can realize the control and adjustment of the color and/or brightness and/or brightness time of the light emitting modules within the angle range of the illumination glass by providing independent control, so as to realize a more dynamic illumination effects and improve the user experience comfort and product market competitiveness.

When applied to the vehicle window glass, the control module can be integrated with the vehicle control unit, where the vehicle control unit includes any control unit on the vehicle side, such as an on-board electronic control unit (ECU) including a central control unit, an on-board entertainment system, a vehicle body control unit and the like. In some embodiments, the control module is an independent hardware and software module. In some embodiments, the control module can adopt any suitable hardware module.

In some embodiments, the control module is configured to communicate with signal generator (or sensor) and/or switch device, etc., so that the control module can provide illumination in response to signals or instructions of the signal generator and/or switch device. The communication protocol includes but is not limited to LIN, CAN, Melibus, ISELED or other types of transmission buses. The switch device is coupled to the control module and provides a switch control signal to the control module. The switch device can be a hardware switch device, a software switch module or a combination thereof. The hardware switch device is, for example, a physical key configured independently or integrated on the vehicle control panel. The software switch module is, for example, a touch switch independently configured or integrated on the vehicle control panel, or a part of the human-computer interaction interface. The above illumination effects can be obtained through the light emitting modules controlled actively by the control module sending instructions according to information provided by for example, sensors, etc., or controlled passively by the driver inputting instructions through voice or actions. These control technologies can be implemented by using existing technologies, and will not be described here.

It should be understood here that the embodiments shown in the drawings only illustrate the optional shapes, sizes and arrangements of various optional components of the illumination glass assembly according to the present disclosure; however, it is only illustrative rather than restrictive, and other shapes, sizes and arrangements can be adopted without departing from the spirit and scope of the present disclosure.

The technical content and technical features of the present disclosure have been disclosed above. However, it can be understood that those skilled in the art can make various changes and improvements to the above disclosed concept under the creative idea of the present disclosure, all of which fall within the protection scope of the present disclosure. The description of the above embodiments is illustrative rather than restrictive, and the protection scope of the present disclosure is determined by the claims.

The invenetion claimed is:

1. An illumination unit for an illuminating glass, the illumination unit comprising a light source and a light guiding component, and the light source comprises a plurality of light emitting modules distributed along an arc to make an emitted incident light to be emitted through the light guiding component to present an angled irradiation range,
    wherein the light guiding component is an arc-shaped light guiding component adapted to the plurality of light emitting modules, and the arc-shaped light guiding component comprises an incident surface attached to the plurality of light emitting modules and an exit surface configured for attachment to a main surface of the illuminating glass,
    wherein the arc-shaped light guiding component is arranged concentrically with said arc so that the incident surface follows the same arc, and
    wherein the arc-shaped light guiding component is formed as a single integrated component extending along said arc and defining an incident surface to which the plurality of light emitting modules are attached at spaced positions along the arc.

2. The illumination unit according to claim 1, wherein the light emitting module is a light emitting diode.

3. The illumination unit according to claim 1, wherein the arc-shaped light guiding component has a triangular cross section.

4. The illumination unit according to claim 3, wherein a cross-sectional dimension of the incident surface is 1 mm to 2.5 mm.

5. The illumination unit according to claim 3, wherein an angle opposite to the incident surface in the triangular cross section is 10° to 13°.

6. The illumination unit according to claim 1, further comprising a light condensing component, and the incident light enters the light guiding component via the light condensing component.

7. The illumination unit according to claim 6, wherein the light condensing component comprises a convex lens arranged between the light source and the light guiding component.

8. The illumination unit according to claim 6, wherein the light condensing component is composed of the incident surface of the light guiding component, and the incident surface protrudes toward the light source.

9. The illumination unit according to claim 1, wherein a material of the light guiding component is selected from glass, polymethylmethacrylate, cycloolefin plastic or alicyclic methacrylate copolymer.

10. The illumination unit according to claim 1, further comprising a control module coupled to the light source and configured to control output intensity and/or output time of one or more of the light emitting modules.

11. An illumination glass assembly, comprising:
    a glass body comprising a first surface and a second surface oppositely arranged; and
    an illumination unit according to claim 1, the illumination unit being arranged on the first surface of the glass body, and making the emitted incident light enter the glass body via the light guiding component to present an angled irradiation range.

12. The illumination glass assembly according to claim 11, wherein the glass body is a first glass body, and the illumination glass assembly further comprises a second glass body attached to the first glass body through an intermediate layer, wherein the second glass body comprises a third surface facing the second surface and a fourth surface oppositely arranged, and the illumination unit is arranged on the first surface or the fourth surface.

13. The illumination glass assembly according to claim 11, wherein the illumination unit is attached to the glass body by an adhesive.

14. The illumination glass assembly according to claim 13, wherein the adhesive is selected from ultraviolet adhesive, optical glue or acrylic acid.

15. The illumination glass assembly according to claim 11, wherein the illumination glass assembly comprises at least one illumination unit arranged adjacent to the edge and/or corner of the glass body.

16. A window assembly, comprising an illumination glass assembly according to claim 11, wherein the window assembly comprises door, window, curtain wall, vehicle window glass, airplane glass or ship glass.

17. The window assembly according to claim 16, wherein the window assembly is a vehicle window glass comprising front windshield, rear windshield, skylight glass, vehicle door glass or corner window glass.

18. The illumination unit according to claim 1, wherein the arc-shaped light guiding component, in cooperation with the plurality of light emitting modules disposed along the arc, is configured to output light along a plurality of distinct diverging directions within the angled irradiation range.

19. The illumination unit according to claim 1, further comprising a control module coupled to the plurality of light emitting modules and configured to selectively activate subsets of the modules to produce illumination in a plurality of diverging directions within the angled irradiation range.

20. The illumination unit according to claim 3, wherein the incident surface of the arc-shaped light guiding component corresponds to a right angle side of a right triangle in the triangular cross section.

21. The illumination unit according to claim 1, comprising a condensing element between at least one of the plurality of light emitting modules and the incident surface of the arc-shaped light guiding component.

\* \* \* \* \*